US012745838B2

(12) United States Patent
Anderson et al.

(10) Patent No.: US 12,745,838 B2
(45) Date of Patent: Sep. 29, 2026

(54) ADJUSTABLE POWER AND DATA RAIL FOR DESKS

(71) Applicant: SQUARE GROVE LLC, Austin, TX (US)

(72) Inventors: Eric W. Anderson, Austin, TX (US); Jon Daniel Paulsen, Austin, TX (US)

(73) Assignee: SQUARE GROVE LLC, Austin, TX (US)

( * ) Notice: Subject to any disclaimer, the term of this patent is extended or adjusted under 35 U.S.C. 154(b) by 141 days.

(21) Appl. No.: 18/777,320

(22) Filed: Jul. 18, 2024

(65) Prior Publication Data

US 2025/0017363 A1 Jan. 16, 2025

Related U.S. Application Data

(63) Continuation of application No. 18/457,033, filed on Aug. 28, 2023, now Pat. No. 12,064,030, which is a continuation of application No. 17/713,815, filed on Apr. 5, 2022, now Pat. No. 11,744,361, which is a continuation of application No. 17/060,655, filed on Oct. 1, 2020, now Pat. No. 11,399,627.

(60) Provisional application No. 62/915,191, filed on Oct. 15, 2019.

(51) Int. Cl.
*A47B 21/06* (2006.01)
*A47B 21/02* (2006.01)
*H02G 3/04* (2006.01)

(52) U.S. Cl.
CPC .............. *A47B 21/06* (2013.01); *A47B 21/02* (2013.01); *H02G 3/0406* (2013.01); *A47B 2021/066* (2013.01)

(58) Field of Classification Search
CPC ... A47B 21/06; A47B 21/02; A47B 2021/066; A47B 91/00; A47B 91/06
USPC ................. 108/180, 50.02; 248/188.8, 188.9
See application file for complete search history.

(56) References Cited

U.S. PATENT DOCUMENTS

| | | | |
|---|---|---|---|
| 4,224,769 | A | 9/1980 | Ball et al. |
| 4,639,049 | A | 1/1987 | Frascaroli et al. |
| 5,078,055 | A | 1/1992 | Bellini |
| 5,103,741 | A | 4/1992 | Grund |
| 5,406,760 | A | 4/1995 | Edwards |

(Continued)

FOREIGN PATENT DOCUMENTS

| | | | |
|---|---|---|---|
| CA | 3061786 A1 * | 5/2020 | ............ A47B 21/02 |
| CA | 3095477 A1 | 4/2021 | |

(Continued)

OTHER PUBLICATIONS

German Patent & Trademark Office; Decision to Grant issued in German Patent Application No. 10 2020 127 202.2; 9 pages; dated Apr. 4, 2023.

(Continued)

*Primary Examiner* — Jose V Chen
(74) *Attorney, Agent, or Firm* — Gray Ice Higdon

(57) ABSTRACT

An adjustable power and data rail for static height and vertically adjustable desks. The adjustable power and data rail fits between the static height and vertically adjustable desks and expands as needed either horizontally or vertically to match the installation configuration with paired multiple desks. The power and data rail provides connectivity for each of the static height or vertically adjustable desks to data and power connectors.

20 Claims, 14 Drawing Sheets

(56) References Cited

U.S. PATENT DOCUMENTS

| | | | | |
|---|---|---|---|---|
| 5,522,324 | A | 6/1996 | Van Gelder et al. | |
| 5,606,919 | A | 3/1997 | Fox | |
| 5,673,632 | A | 10/1997 | Sykes | |
| 6,003,447 | A | 12/1999 | Cox et al. | |
| 6,024,024 | A | 2/2000 | Favaretto | |
| 6,076,903 | A | 6/2000 | Vander Park | |
| 6,086,028 | A | 7/2000 | Pfister | |
| 6,152,048 | A | 11/2000 | Vander Park | |
| 6,202,567 | B1 | 3/2001 | Funk | |
| 6,267,064 | B1 | 7/2001 | Ostertag et al. | |
| 6,397,762 | B1 | 6/2002 | Goldberg et al. | |
| 6,415,723 | B1 | 7/2002 | Kopish | |
| 6,848,369 | B1 | 2/2005 | King et al. | |
| 7,357,086 | B2 | 4/2008 | Petrick | |
| 7,665,255 | B2 | 2/2010 | Dressendorfer et al. | |
| 8,196,525 | B2 | 6/2012 | Flanet | |
| 8,783,612 | B1 | 7/2014 | Barr et al. | |
| 8,910,435 | B2 | 12/2014 | Feldpausch | |
| 8,967,054 | B2 | 3/2015 | Henriott et al. | |
| D819,378 | S * | 6/2018 | Lin | D6/709 |
| 10,034,539 | B2 | 7/2018 | Steelman et al. | |
| 10,045,611 | B1 | 8/2018 | Siebert et al. | |
| 11,399,627 | B2 * | 8/2022 | Anderson | A47B 9/20 |
| 11,744,361 | B2 * | 9/2023 | Anderson | A47B 21/06<br>108/50.02 |
| 12,064,030 | B2 * | 8/2024 | Anderson | A47B 21/02 |
| 2006/0065167 | A1 | 3/2006 | Chi et al. | |
| 2009/0273260 | A1 | 11/2009 | Kemp | |
| 2012/0103234 | A1 | 5/2012 | Schiavello et al. | |
| 2013/0306809 | A1 | 11/2013 | Bakehouse | |
| 2015/0083028 | A1 | 3/2015 | Bedard | |
| 2015/0083870 | A1 | 3/2015 | Steelman et al. | |
| 2015/0204061 | A1 | 7/2015 | Saich et al. | |
| 2016/0374464 | A1 | 12/2016 | Schiavello et al. | |
| 2017/0086581 | A1 | 3/2017 | Gammon et al. | |
| 2017/0251806 | A1 | 9/2017 | Newman | |
| 2017/0324230 | A1 | 11/2017 | Warrilow | |
| 2018/0055229 | A1 | 3/2018 | Game et al. | |
| 2019/0069669 | A1 | 3/2019 | Hall et al. | |
| 2019/0350358 | A1 | 11/2019 | Knapp | |
| 2021/0106133 | A1 | 4/2021 | Anderson et al. | |
| 2021/0196045 | A1 | 7/2021 | Putzke | |
| 2022/0225761 | A1 | 7/2022 | Anderson et al. | |
| 2023/0397720 | A1 | 12/2023 | Anderson et al. | |

FOREIGN PATENT DOCUMENTS

| | | | | |
|---|---|---|---|---|
| DE | 69314023 | T2 | 2/1998 | |
| DE | 202006008208 | U1 | 8/2006 | |
| DE | 102015005749 | A1 | 1/2016 | |
| DE | 102019108708 | A1 | 10/2020 | |
| DE | 102020127202 | A1 | 4/2021 | |
| EP | 0481878 | A1 | 4/1992 | |
| WO | 2009052656 | A1 | 4/2009 | |
| WO | WO-2020086949 | A1 * | 4/2020 | H01R 25/162 |

OTHER PUBLICATIONS

United States Patent & Trademark Office; Non-Final Office Action issued in U.S. Appl. No. 18/457,033; 24 pages; dated Mar. 21, 2024.
United States Patent & Trademark Office; Notice of Allowance issued in U.S. Appl. No. 18/457,033; 72 pages; dated Apr. 19, 2024.
Canadian Patent Office, Notice of Allowance issued in Application No. 3095477, 1 page, dated Oct. 31, 2025.

* cited by examiner

ADJUSTABLE POWER AND DATA RAIL FOR DESKS

BACKGROUND

Vertically adjustable desks are often grouped together in multiple working group configurations. This includes a number of desks which have a work surface which is supported by a first and a second leg, both the first and the second leg of the desk are vertically adjustable to change the elevation of the work surface. Such adjustable desks are becoming more popular due to the flexible height of the work surface and the ability of the user to sit at the desk work surface or stand at the work surface of the desk. Further, while it is common to join multiple desks into connected work surfaces, providing power and data to these various installation configurations can prove difficult. Not only are the vertically adjustable desks provided in varying lengths, but due to the ability to raise the desks, the height necessary for data and power ports is modified depending on a particular configuration.

SUMMARY

The present disclosure includes adjustable power and data rails for static height and vertically adjustable desks. The adjustable rails can be combined into connected adjustable power and data rails to interconnect between multiple combined vertically adjustable or static height desks. For example, a first and a second adjustable power and data rail may be combined beneath a plurality of, for example, four vertically adjustable desks wherein the power and data rails are connected below and between the vertically adjustable desk work surfaces. In implementations the adjustable power and data rails are adjustable in both the vertical and horizontal directions in order to match the height and length requirements of the joined vertically adjustable desks.

For example, the adjustable power and data rails may be adjustable horizontally with respect to the static height or vertically adjustable desks to adjust for varying length requirements of the desk installation. In some implementations, the adjustable power and data rails may be horizontally adjustable by utilizing telescoping rail extensions which are received into a central rail assembly. The overall horizontal length of the power and data rail may thus be adjusted by inserting the rail extensions at either a first and/or a second end of the central rail assembly. Each of the rail extensions may be locked into their positions, when either one or both are utilized on either side of the central rail assembly, by a securing mechanism. For example, at least one set screw may be utilized to secure the horizontal position of the rail extension with respect to the central rail assembly. In various implementations, the securing mechanism may fit into a rail adjustment slot of the central rail assembly securing the central rail assembly and the rail extension into place relative to each other.

The adjustable power and data rails may also be vertically adjustable with respect to the vertically adjustable desks to adjust for varying height requirements of the vertically adjustable desk installation. In some implementations, the adjustable power and data rails may be vertically adjustable by utilizing a rail post having a telescoping upper and lower rail post sections. The upper rail post may receive the related rail extension to form the power and data rail under the entirety or a portion of the vertically adjustable desk assembly. The overall vertical height of the power and data rail may thus by modified by adjusting and securing with respect to each other the upper and lower rail post. The upper or lower rail post may be secured with a securing mechanism which may extend through an outer of the upper or lower rail post to secure the outer post relative to the inner post. Either the upper rail post or the lower rail post may be utilized as the inner post or the outer post.

For example, the lower rail post may telescopically fit into the interior of the upper rail post and slide vertically relative thereto. In some examples, the lower rail post may be secured in position with respect to the upper rail post by use of securing mechanisms. For example a first and a second set screw may extend through the outer, upper rail post, to secure the position of the upper rail post with respect to the inner, lower rail post such that the lower rail post slides vertically into the upper rail post.

In some examples, the adjustable power and data rails include a first and a second end rail post with a single or multiple interposed central rail posts. Each of the first and the second end rail posts may be vertically adjustable. A central rail post may receive the power and data rails from respective first and second end rail posts, the central rail post also being vertically adjustable in similar fashion as compared to the first and second end rail post.

Power and data lines may be fitted and extend along at least a portion of the length of the data rails including the rail extensions and the rail assembly which receives the rail extensions. In other implementations, the rail extensions may receive the central rail assembly and either construction is included in the teachings hereof. Further a wire tray may be fitted along at least a portion of the length of the central rail assembly.

In implementations, the central rail posts and the first and the second end rail posts may each be vertically adjustable. Also, the rail assembly may be horizontally adjustable in combination with the adjustable end and central rail posts.

In implementations, the adjustable power and data rail may be positioned below and along the length of a plurality of vertically adjustable desks. For example, the adjustable power and data rail may be positioned below a quadrant of vertically adjustable desks. In other implementations, the adjustable power and data rail may be positioned below a triad of vertically adjustable desks wherein the adjustable power and data rails include a central rail post and a first, second and third end rail post. In implementations, the adjustable power and data rail, regardless of the number of vertically adjustable desks, can be both vertically and horizontally adjustable to match the required vertical desk installation.

In further examples, the adjustable power and data rail may include at the first and second end rail post a foot bracket which has a first and a second aperture for receiving the respective foot pad from opposing static height or vertically adjustable desk foot. In some implementations, the adjustable power and data rail may include at the center rail posts a central foot bracket which has a first, second, third and fourth aperture for receiving the respective foot pad from opposing desks. For example, in some implementations, the foot bracket has multiple apertures to receive a foot leveling pad from one desk and at least another foot pad from a facing desk to secure the desks in position relative to the adjustable power and data rail and relative to each other.

In additional implementations, the adjustable power and data rail may include a center rail post which includes a central foot bracket for affixation to adjacent and/or facing respective static height or vertically adjustable desk foot. For example, in some implementations, a central rail post central foot bracket may include a first, second, third and fourth attachment point or flanges which affixes above, underneath or adjacent to respective first, second, third and fourth desk foot.

Further, in implementations, extending between the first and the second end rail posts may extend the power and data lines either interiorly or exteriorly of the horizontally adjustable rail assembly and rail extensions.

In various implementations, the adjustable power and data rail may be combined with a plurality of vertically adjustable desks wherein the desks include a horizontal work surface and a first and a second vertically adjustable or static leg. Each of the first and the second leg may include a desk foot, the desk foot for the desk having a first and a second desk foot pad. In examples, a foot pad of respective facing desks may be positioned within a respective aperture of the foot bracket for the adjustable power and data rail posts to secure the respective facing desks relative to the power and data rail.

Each of the vertically adjustable desk may also have an electric motor to adjust the vertical position/height of the horizontal work surface. The electric motor may be operable by power controls for the vertically adjustable desk allowing the height of the first and the second vertically adjustable legs of the desk to be adjusted without necessitating adjustment of the power and data rails extending below the vertically adjustable desks.

Various implementations of an adjustable power and data rail for use with vertically adjustable desks are disclosed herein.

In some implementations, the present disclosure sets forth an adjustable power and data rail for use with vertically adjustable desks including a single or multiple center rail posts and at least a first and a second end rail post, wherein between the center rail posts and each of the at least first and second end rail post is a rail assembly and a first and a second rail extension, each of the first and second rail extension horizontally adjustable relative to the rail assembly; the center rail posts and each of the first and the second end rail post having an upper rail post and a lower rail post vertically adjustable relative to each other; each of the rail assembly between the center rail post and each of the first and the second end rail post having a wire tray; each of the center rail posts and the first end rail post and the second end rail post having a foot bracket, each of the center rail posts and the first end rail post foot bracket and second rail post foot bracket having a first and a second foot receiving aperture and center rail post foot brackets having a first, second, third and fourth foot receiving aperture; the first end rail post foot bracket first aperture positioned to receive a first static height or vertically adjustable desk foot pad; the first end rail post foot bracket second aperture positioned to receive a second desk foot pad; the second end rail post foot bracket first aperture positioned to receive a third desk foot pad; the second end rail post foot bracket second aperture positioned to receive a fourth desk foot pad.

These and other implementations disclosed herein may optionally include one or more of the following features.

In some embodiments, the center rail post has a central foot bracket, the central foot bracket positioned to attach to the first, second, third and fourth vertically adjustable desk. In some implementations, the central foot bracket has a first, second, third and fourth flange, the first flange positioned to attach to the first vertically adjustable desk, the second flange positioned to attach to the second vertically adjustable desk, the third flange positioned to attach to the fourth vertically adjustable desk. In other implementations, the first, second, third and fourth flanges are each a flat flange positioned to affix to an underside surface of a desk foot of the respective vertically adjustable desk.

In various embodiments, the rail assembly between the center rail post and the first end rail post has a longitudinal slot which receives at least one securing mechanism extending into the first rail extension between the first end rail post and the center rail post. Additionally, such embodiment may optionally include the rail assembly between the center rail post and the second end rail post having a longitudinal slot which receives at least one securing mechanism extending into the first rail extension between the second end rail post and the center rail post.

In embodiments, the rail assembly between the center rail post and the first end rail post is tubular and wherein the rail assembly between the center rail post and the second end rail post is tubular. Optionally the rail assembly between the center rail post and the first end rail post may have at least one data port and at least one power port and wherein the rail assembly between the center rail post and the second end rail post has at least one data port and at least one power port.

In some implementations, the center rail post foot bracket includes four apertures to accept the foot pad from a first, second, third and fourth static height or vertically adjustable desk.

In some implementations, the center rail post is securely affixed or positioned to retain the first, second, third and fourth static height or vertically adjustable desk by a central rail post foot bracket, the central bracket attaching to lower surface of a desk foot for each respective first, second, third and fourth vertically adjustable desk.

In other implementations, each of the first, second, third and fourth vertically adjustable desk have a first vertically adjustable leg and a second vertically adjustable leg supporting a work surface, the work surface raised and lowered by the first and the second vertically adjustable leg.

Also described is an adjustable power and data rail for use with vertically adjustable desks, comprising: at least one center rail post and at least a first and a second end rail post, wherein between the center rail post and each of the at least first and second end rail post is a rail assembly and a first and a second rail extension, each of the first and second rail extension adjustable relative to the rail assembly to modify the length of the adjustable power and data rail; the center rail posts and each of the first and the second rail post having an upper rail post and a lower rail post adjustable relative to each other to modify the height of the adjustable power and data rail; each of the rail assemblies between the center rail posts and the at least first and the second end rail post having a wire tray; the adjustable power and data rail interposed between at least a first and a second vertically adjustable desk.

These and other implementations disclosed may optionally include one or more of the following features.

In some embodiments, each of the first end rail post has a first foot bracket and the second end rail post has a second foot bracket. Optionally this may include the first end rail post first foot bracket receives a first vertically adjustable desk foot pad; the first end rail post first foot bracket receives a second vertically adjustable desk foot pad; the second end rail post second foot bracket receives a third vertically adjustable desk foot pad; the second end rail post second foot bracket receives a fourth vertically adjustable desk foot pad.

In still further implementations, a third end rail post and a third rail assembly between the third end rail post and the center rail post, and a first rail extension extending between the center rail post and the third rail assembly, and a second rail extension extending between the third end rail post and the rail assembly.

Further, set forth is an adjustable power and data rail for use with vertically adjustable desks, comprising: a center rail post secured to a flat central foot bracket, the central foot bracket respectively receiving a desk foot of a first, second, third and fourth vertically adjustable desk; the center rail post attached to a first end rail post by a first and second rail extension having a first rail assembly interposed between the first and the second rail extension; the first rail assembly, first and second rail extension adjustable relative to each other and between the center rail post and the first end rail post; the center rail post attached to a second end rail post by a third and a fourth rail extension having a second rail assembly interposed between the third and the fourth rail extension; the second rail assembly, third and fourth rail extension adjustable relative to each other and between the center rail post and the second end rail post; the first and the second end rail post each having an upper rail post and a lower rail post slidable relative to each other; the first end rail post receiving a foot pad from the first and the second vertically adjustable desk; the second end rail post receiving a foot pad from the third and the fourth vertically adjustable desk.

These and other implementations disclosed herein may optionally include one or more of the following features.

In various implementations, the adjustable power and data rail may be implemented in combination with static or variably height desks.

In some embodiments, each of the first end rail post and the second end rail post have a foot bracket, each of the first end rail post foot bracket and second rail post foot bracket having a first and a second foot receiving aperture. Optionally such may include the first end rail post foot bracket first aperture is positioned to receive a first static height or vertically adjustable desk foot pad; the first end rail post foot bracket second aperture positioned to receive a second static height or vertically adjustable desk foot pad; the second end rail post foot bracket first aperture positioned to receive a third static height or vertically adjustable desk foot pad; the second end rail post foot bracket second aperture positioned to receive a fourth static height or vertically adjustable desk foot pad.

In other embodiments, the first rail assembly between the center rail post and the first end rail post is tubular and wherein the second rail assembly between the center rail post and the second end rail post is tubular. Optionally, the first rail assembly slidingly receives internally the first and the second rail extension and wherein the second rail assembly slidingly receives internally the third and the fourth rail extension.

In still further implementations, the first rail assembly between the center rail post and the first end rail post has at least one data port and at least one power port and wherein the second rail assembly between the center rail post and the second end rail post has at least one data port and at least one power port.

It should be appreciated that all combinations of the foregoing concepts and additional concepts described in greater detail herein are contemplated as being part of the subject matter disclosed in this specification. For example, all combinations of claimed subject matter appearing at the end of this disclosure are contemplated as being part of the content and subject matter disclosed herein.

DETAILED DESCRIPTION

Various implementations are disclosed herein for an adjustable power and data rail which can be used for static height and vertically adjustable desks. In various implementations, the adjustable power and data rail may be adjustable in both the vertical and horizontal directions thereby accommodating differing length vertically adjustable desk installations.

Figure 1:
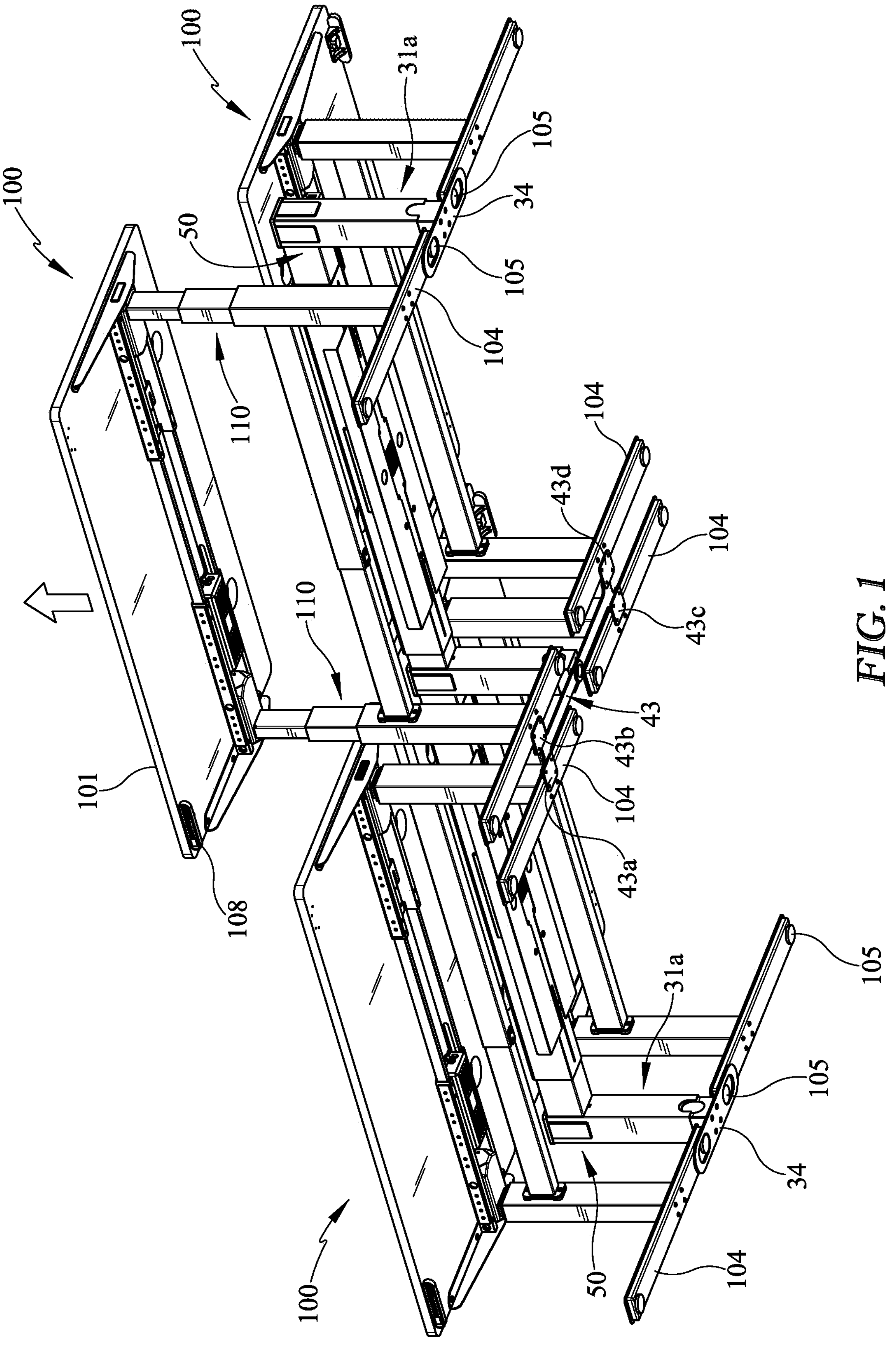
FIG. 1 depicts a lower perspective view of a system and grouping of vertically adjustable desks having an adjustable power and data rail therebetween.

As depicted in FIG. 1, a grouping of vertically adjustable desks 100 are provided having an adjustable power and data rail 50 interposed between groups of paired facing desks 100. The adjustable power and data rail 50 is positioned to feed both power and data connectivity to each of the vertically adjustable desks within the group. Further, depending on the particular style or installation of vertically adjustable desks 100, the adjustable power and data rail 50 may be accommodated by modifying the length and/or height of the rail 50.

Figure 2:
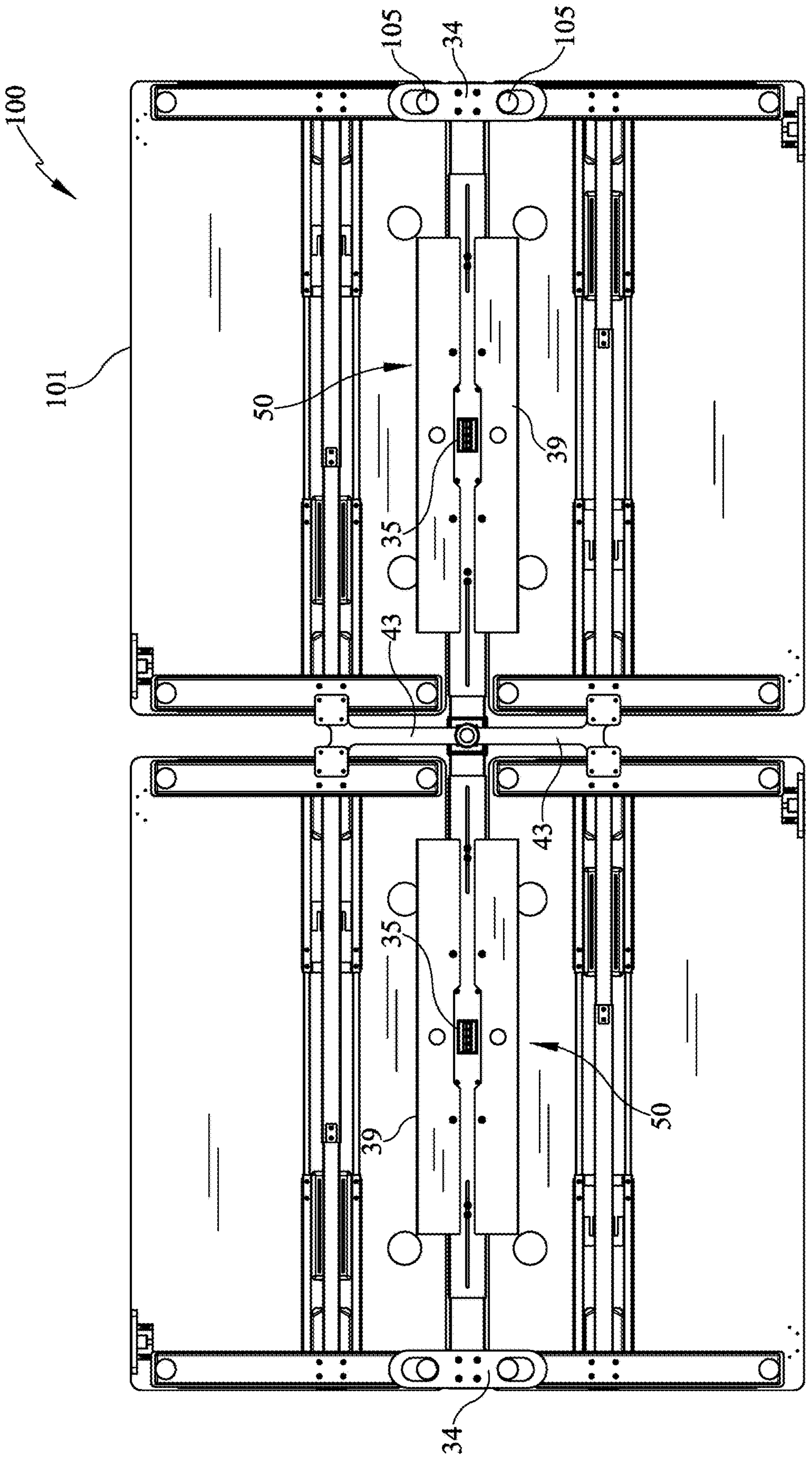
FIG. 2 depicts a bottom view of the system and grouping of FIG. 1.

Referring to FIGS. 1 and 2, a grouping of vertically adjustable desks 100 are in paired face to face relationship. The power and data rail 50 is positioned in between pairs of desks and is adjustable horizontally, depending on the width of the desks 100, or vertically as may be dictated by connectivity concerns or height requirements for the desks. Each of the desks are vertically adjustable by a control 108 which raises and lowers the working surface 101 by virtue of the adjustable legs 110 which are expanded or retracted by at least one electric motor positioned within the vertically adjustable legs.

Each of the vertically adjustable desks 100 includes legs 110 which have a desk foot 104 and desk foot pad 105. Each of the desks within the combined configuration may be independently adjusted vertically within the grouping while the power and data rail 50 interconnects the group of desks together by use of the end post rail foot bracket 34 and center rail post central foot bracket 43, 49 or 49*c*. As a result, the electrical and data connectivity of the desks 100 to the adjustable power and data rail 50 can be maintained and secured.

Figure 3:
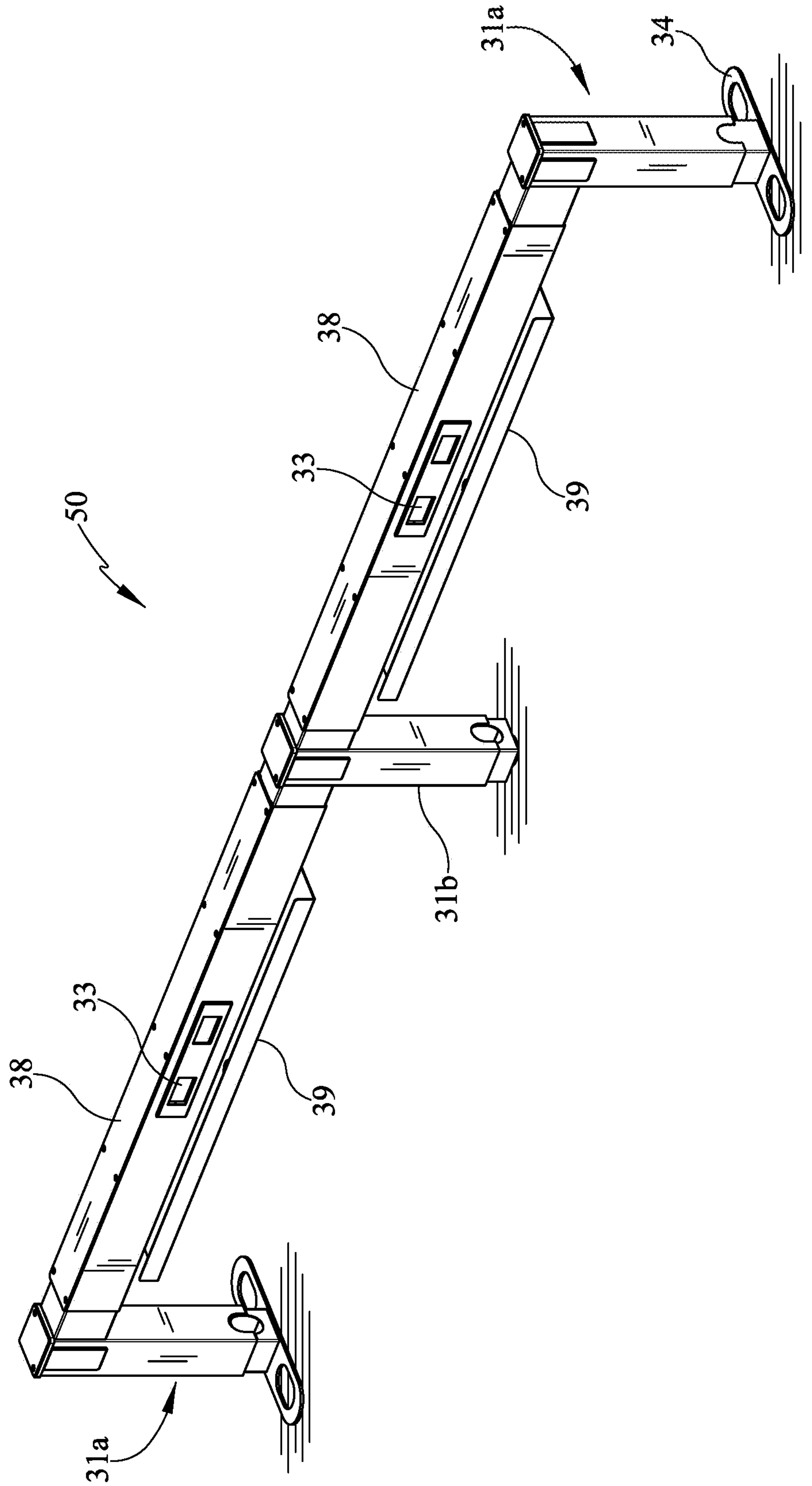
FIG. 3 details an upper perspective view of an adjustable power and data rail disclosed herein.
Figure 4:
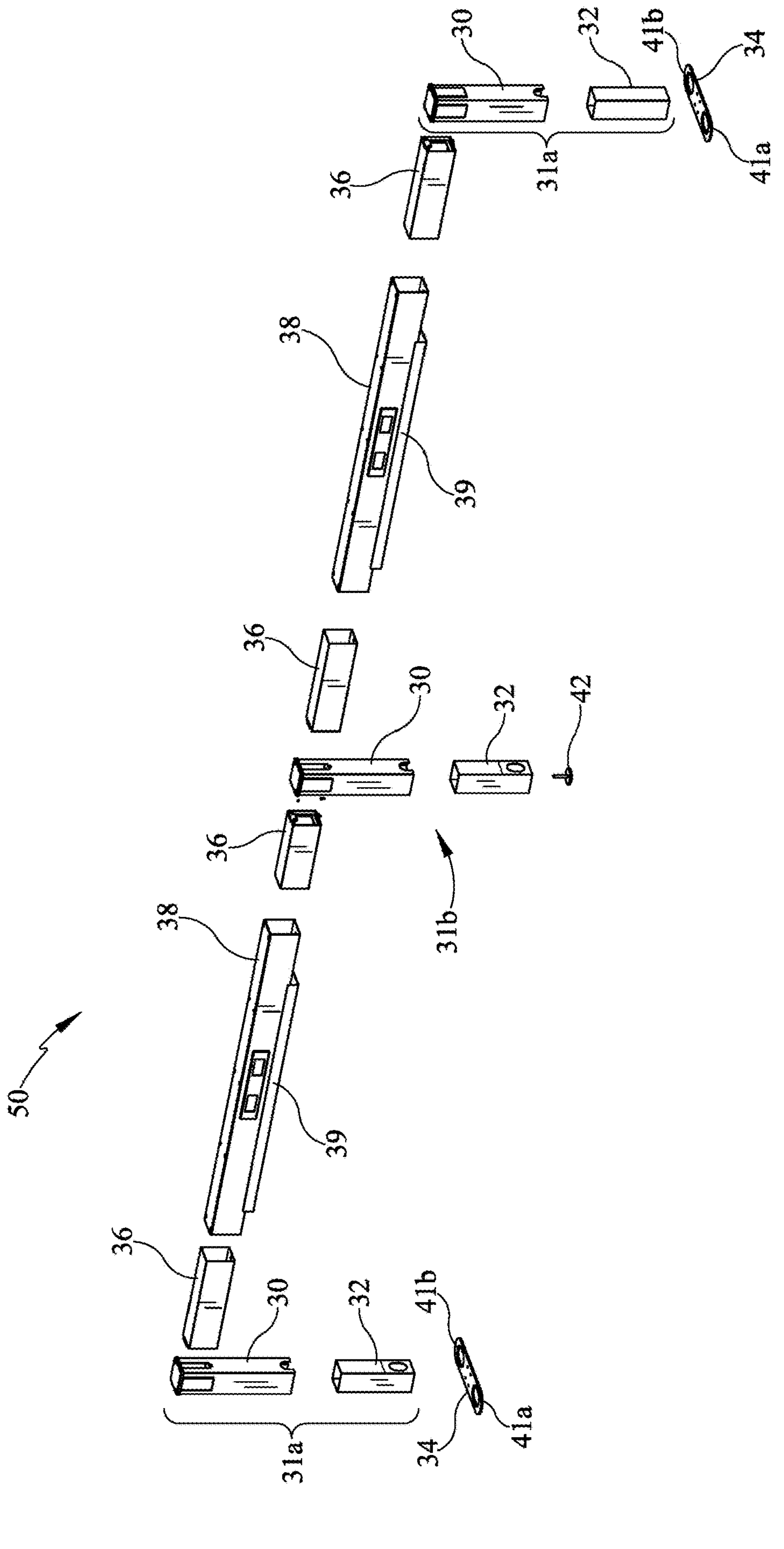
FIG. 4 depicts an exploded view of the power and data rail of FIG. 3.

In FIGS. 3 and 4, the adjustable power and data rail includes two end rail posts 31*a* and a center rail post 31*b*. Positioned between the center rail post 31*b* and each of the end rail posts 31*a* is a rail assembly 38 and a first and a second rail extension 36. The rail extensions 36 positioned at either end of the rail assembly provide the ability to adjust each left and right portion of the adjustable power and data rail horizontally to fit various width vertically adjustable desk configurations. For example, each rail extension 36 may fit or telescope into an interior portion of the rail assembly 38 and be adjustable along the length of the rail extension 36. In some instances, the individual rail extensions may telescope into the rail assembly and be secured in position to allow for extended length. In still further instances, the rail assembly may fit or telescope into the rail extension allowing for horizontal adjustment of the length of the adjustable power and data rail system 50.

The horizontal length of the power and data rail 50 may be adjusted based upon the length of each of the rail extensions 36. For example, in the embodiment depicted in FIGS. 3 and 4, the power and data rail 50 may be horizontally adjusted up to four times the length of each of the rail extensions 36. Various implementations may include each of the four individual rail extensions 36 depicted. Other embodiments may include fewer rail extensions. For example, in some implementations, a single longer rail extension may be provided at one end of the rail assembly wherein the opposite end of the rail assembly directly or indirectly attaches to the end rail post 31*a* or center rail post 31*b*. Various implementations may incorporate modifications to the rail extensions 36 to allow for increased expandability. For example, in some implementations, a single longer rail extension 36 may be provided on one end of the rail assembly 38. In other implementations, various combinations of single, double or no rail extensions may be provided.

Figure 6:
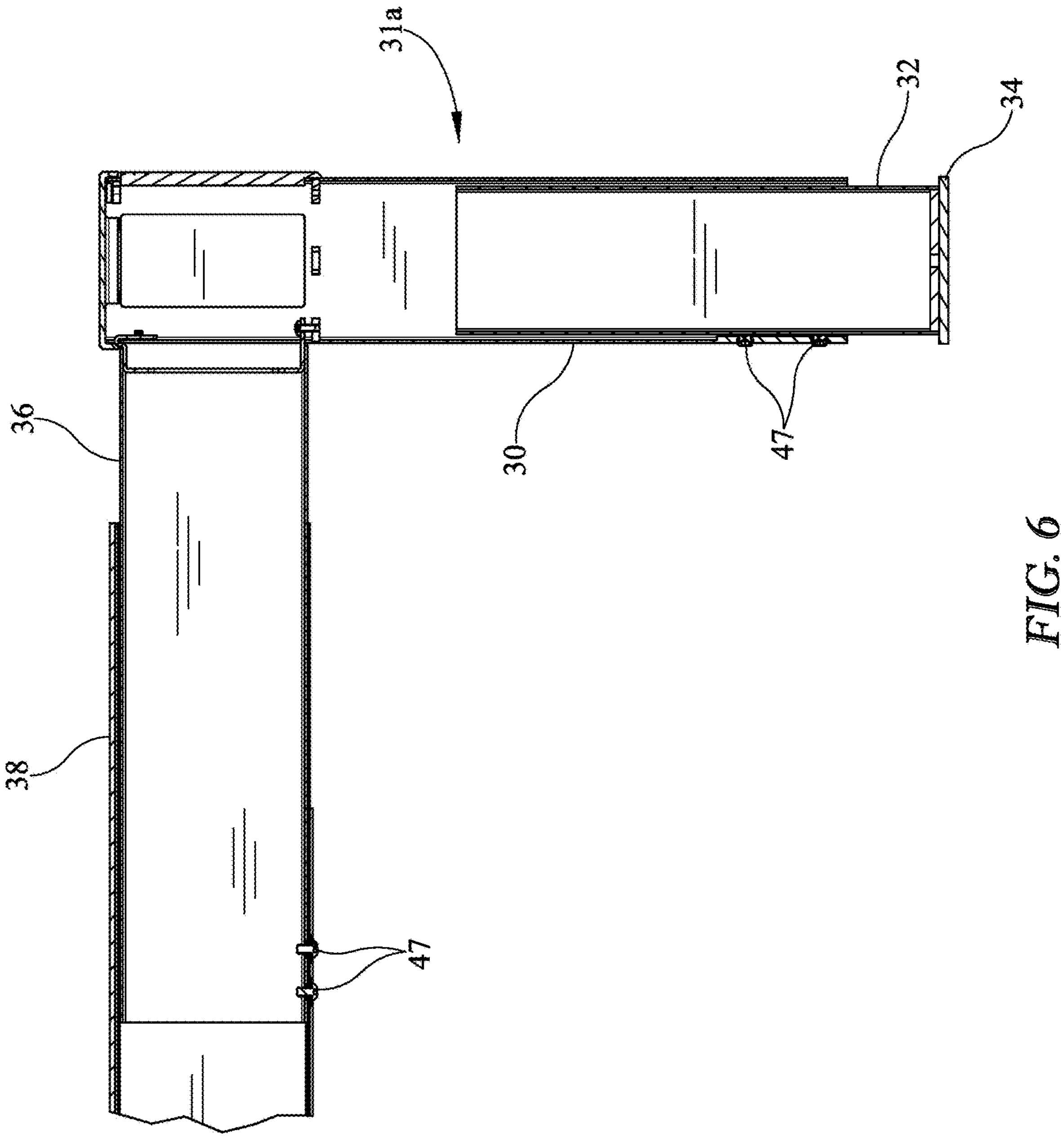
FIG. 6 is a side sectional close up view of a portion of the power and data rail of FIG. 3.
Figure 7:
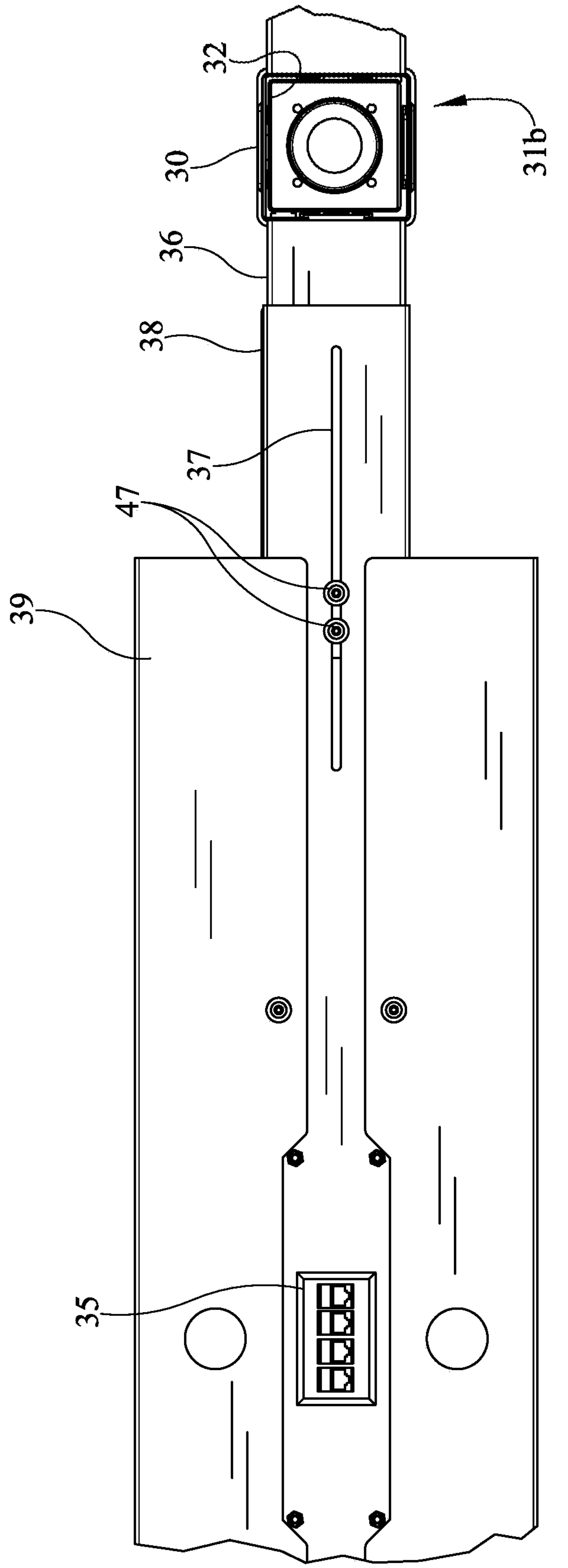
FIG. 7 is a bottom view of the power and data rail of FIG. 6.

Each of the rail extension 36 depicted in the figures slidingly engages the adjacent rail assembly 38 to allow for horizontal or width adjustability. As depicted in these figures as well as FIGS. 6 and 7, the rail extension may slide relative to the rail assembly 38. For example, the rail extension as shown may telescope internally to the rail assembly. Other configurations may be implemented such as, for example, the rail assembly sliding into the interior of the rail extension, bolt on extender blocks between the rail extension and the rail assembly, or other structure allowing for adjustable horizontal expansion or decrease of the length of the power and data rail 50.

In various implementations, securing mechanisms may be implemented to secure the relative position and horizontal adjustability of the rail extension to the rail assembly. For example, in some implementations, a rail assembly slot 37 may be provided to receive a locking screw/securing mechanism 47. The locking screw 47, extending through the slot 37, may secure the relative position of the two structures once the overall length and position is decided. Other configurations of a securing mechanism may be implemented. For example, instead of a slot, a plurality of apertures may be provided for a securing device to extend through the rail assembly to the rail extension. As well, many types of securing devices may be implemented as a securing mechanism/locking screw. For example, cam levers, compression nuts or other structure may fixate the rail extension position relative to the rail assembly position. Also, for example, similar devices may be provided to fixate the rail assembly position relative to the rail extension position if alternative adjustable movement is implemented. For example, if the rail assembly telescopes into the rail extension, alternative securing mechanism are supported for fixating relative positions.

Figure 8:
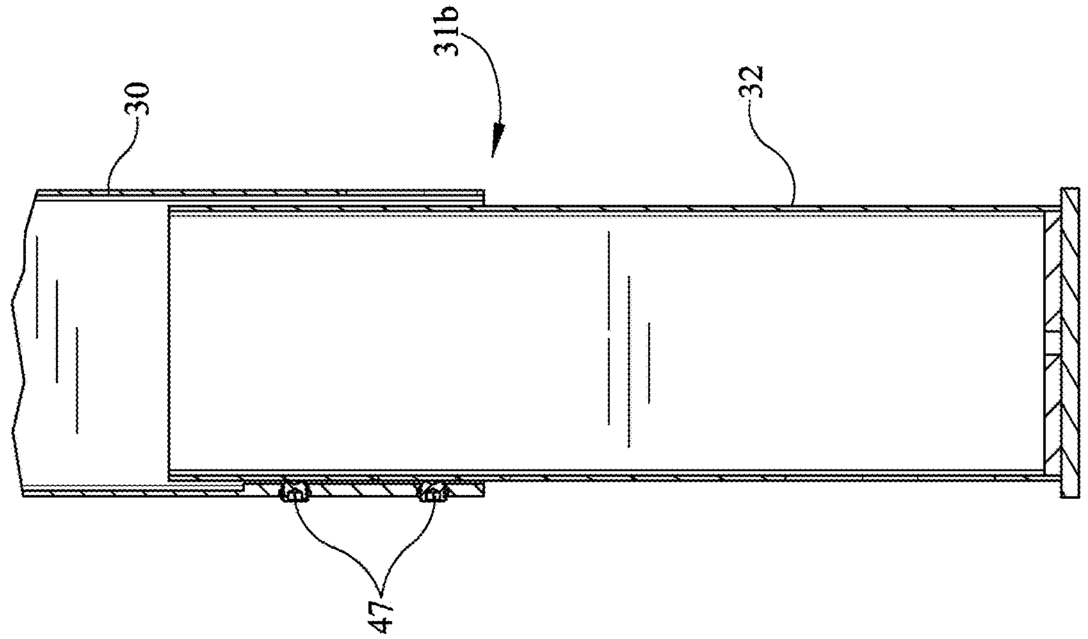
FIG. 8 is side sectional view of an adjustable rail post for use with the power and data rail system disclosed herein.

Similarly, vertical adjustment may be implemented at each of the center rail post 31*b* and the end rail posts 31*a*. Vertical or height adjustability may be provided at each of the posts. For example, an upper rail post 30 and lower rail post 32 combination allows relative movement between the upper and lower rail post 30/32 to adjust the overall vertical position of the rail assembly 38 for the adjustable power and data rail 50. In implementations, a lower rail post 32 may slide relative to the upper rail post 30 to adjust for varying height requirements. For example, the lower rail post may slide or telescope into upper rail post 30 and be secured relative thereto. As depicted in the figures and in combination with FIG. 8 and the center rail posts 31*c* of FIGS. 11-14, the lower rail post 32 may fit into the upper rail post for the center rail post 31*b*/31*c*. The position of the two structures of the lower and upper rail post 30/32 may be fixated by locking screws/securing mechanisms 47. Lower rail post 32 may also have an adjustable foot pad 42 at a lower end therein that is vertically adjustable by threads or other securing mechanism.

In implementations, securing mechanism 47 for the center and end rail post 31*b*/31*a* may lock the relative positions of the two upper and lower rail post structures. For example, locking screws and adjustment slots may be configured. In other examples and configurations, a plurality of apertures may receive the mechanisms allowing a fastening structure to extend through an outer structure to affix or provide pressure to an inner structure. Other securing devices may be used in place or in addition thereto such as cam locks or similar devices described herein. Alternatively, in some implementations, the center and end rail posts can be fixed in height with adjustable foot pads which raise and lower the height of the power and data rail structure. In implementations, means are provided to adjust the vertical positioning of the power and data rail structure at each of the rail posts to equalize their height.

In such implementations, the vertical height of the power and data rail 50 may be adjusted at each of the rail posts 31*a*, 31*b*, 31*c*. The variability of the vertical adjustment may be modified through the length of the upper and lower rail posts 30, 32 or with regards to additional structure interposed between the lower rail post 32 and the rail post foot bracket 34 as noted.

Figure 5:
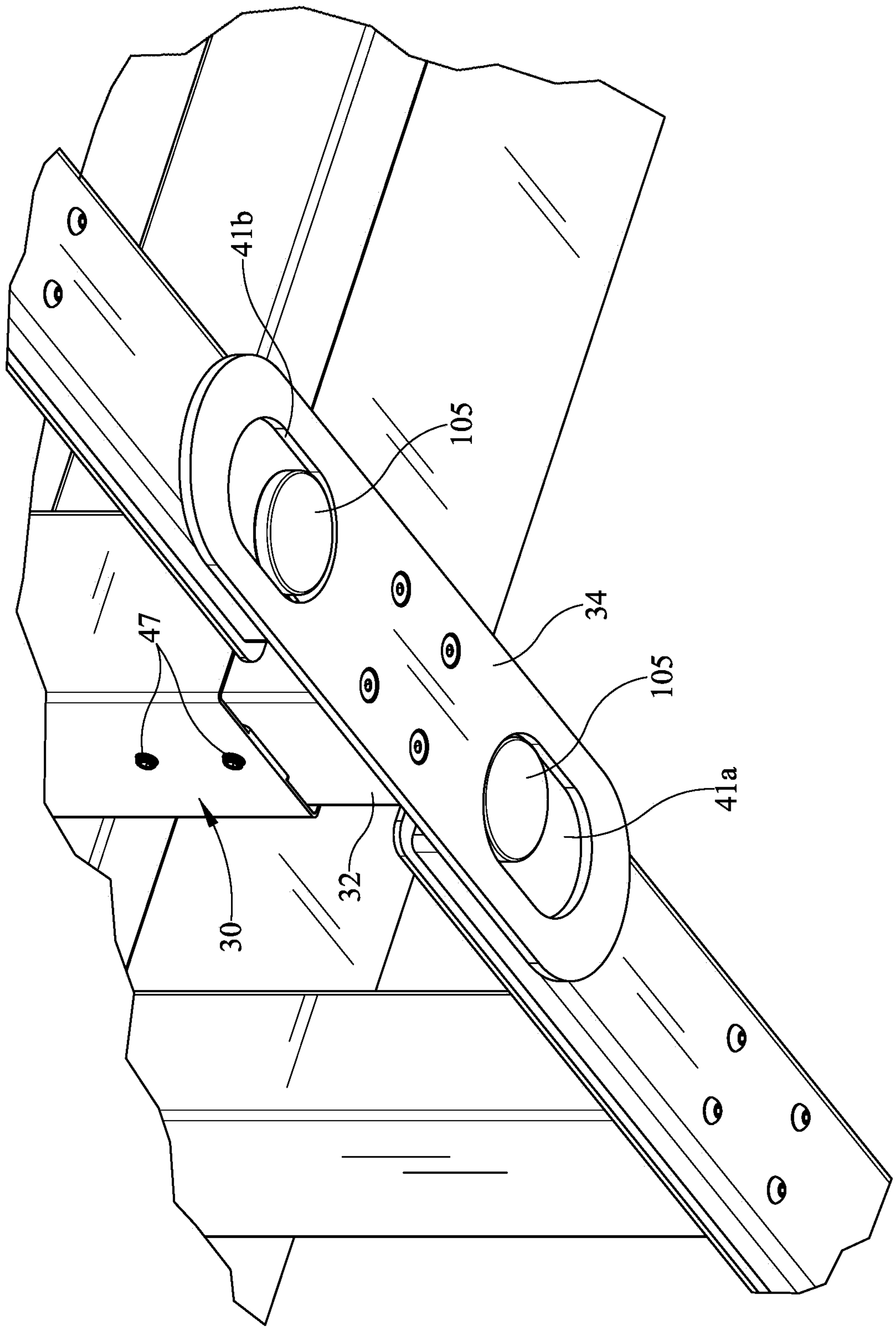
FIG. 5 details a lower perspective view of the power and data rail foot bracket interconnected with desks, as shown in FIG. 1.

Rail post foot bracket 34 may attach to a lower end of the lower rail post 32 to increase the stability of the contact point of the rail post 31*a* and the ground. Securing or affixing the power and data rail 50 to the vertically adjustable desks 100 may also include foot bracket 34 provided with a first and a second aperture 41*a*, 41*b* at opposing ends of the foot bracket. Foot bracket apertures 41*a*, 41*b* as shown in FIG. 5, may interlock with the associated desk foot pad 105. Providing apertures 41*a*, 41*b* in the bracket 34 allows the foot pads 105 from adjacent desks to be evenly positioned on the floor or supporting surface as the bracket 34 thereby positioning them at common horizontal height. Foot bracket apertures 41*a*, 41*b* allow for securing the adjustable power and data rail to the vertically adjustable desks. For example, forward facing vertically adjustable end legs may be interlocked in the bracket 34 as depicted in FIGS. 1 and 2 securing the vertically adjustable desks to the power and data rail.

Securing or affixing the power and data rail 50 to the vertically adjustable desks 100 may also include the central foot bracket 43. Central bracket can be considered a center rail post foot bracket for retaining desks in adjacent relationship. For example, central foot bracket 43 may include attachment flanges 43*a*, 43*b*, 43*c*, 43*d*, at four points to attach to the underside of vertically adjustable desks foot 104 which are all co-adjacent in a quadrant. For example, a quadrant of four vertically adjustable desks, is formed by placing them in paired front facing relationship thereby positioning four adjacent desk foot 104, as shown in FIG. 2, all of which may be attached to the central foot bracket 43 of the adjustable power and data rail 50. Central foot bracket 43 may variously be affixed to the plurality of adjacent desk feet 104. For example, the bracket may be placed on a lower surface, side surface or upper surface. Alternatively, bracket may provide sleeves for desk feet 104 to fit into or ay secure to a portion of the vertically adjustable leg 110 of the desk 100.

Alternatively, as depicted in FIGS. 11, 12, 13, 14 the central foot bracket 49, 49*c* may receive the associated desk foot pad within four receiving apertures of the central foot bracket 49. In such manner, the central foot bracket allows the power and data rail 50 to securely be connected to the adjacent desks while also removing the requirement of direct attachment of the desk to the bracket. In such implementation, central post 31*c* may be fully adjustable for the modifiable height of the power and data rail similar to the end posts while also allowing the power and data rail to be secured to the desks by simply receiving the respective foot pad within bracket 49. The central post 31*c* may be constructed of a two-piece post similar to the end posts wherein the two posts structures form an upper and lower post such as upper and lower post 30, 32 of the end rail post. Further, such central post 31*c* may be telescoping and adjustable to modify the height of the central post 31*c* similarly to the end posts 31*a*. Further, in the variations shown in these figures, a central partition 70 may be provided between facing desks and supported by partition brackets 71. As well, in variations, the data port and power port 33, 35 may be positioned respectively on the outward facing surface of the power and data rail or in multiple faces, such as for example mixing the positions of the power and data ports on a side surface, bottom surface or combination thereof.

As shown in the figures, rail assembly 38 in implementations may have a hollow interior allowing for wire ways for cable or other wiring to extend. Data ports 35 and electrical ports 33 may be provided at various locations of the rail assembly 38 allowing for connectivity of user vertically adjustable desk user devices. Associated wire trays 39 along a portion of the length of the rail assembly may be provided to retain length of cables connected to the data ports or the power ports 33. Data ports 35 are depicted as being provided on an outer surface of the rail assembly 38 but may be placed at any position along the outward facing side or lower surface of the rail assembly, or combinations thereof, for accessibility. Similarly the power line ports 33 may be positioned along the rail assembly at desired locations to allow user devices to access power fed to the power line ports from standard line voltage power sources.

Figure 9:
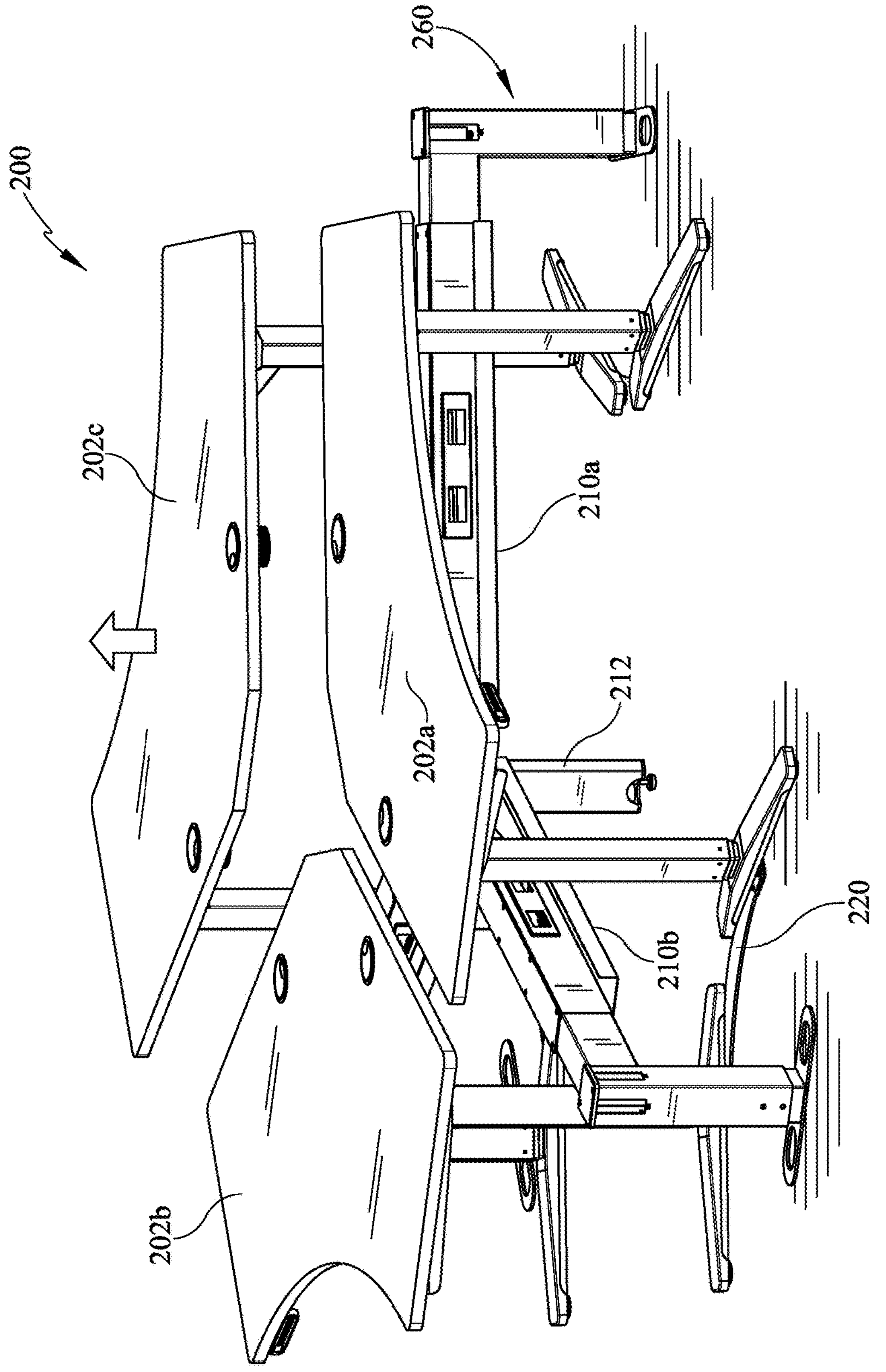
FIG. 9 is another embodiment for an upper perspective view of the adjustable power and data rail system utilized in a different vertically adjustable desk configuration.
Figure 10:
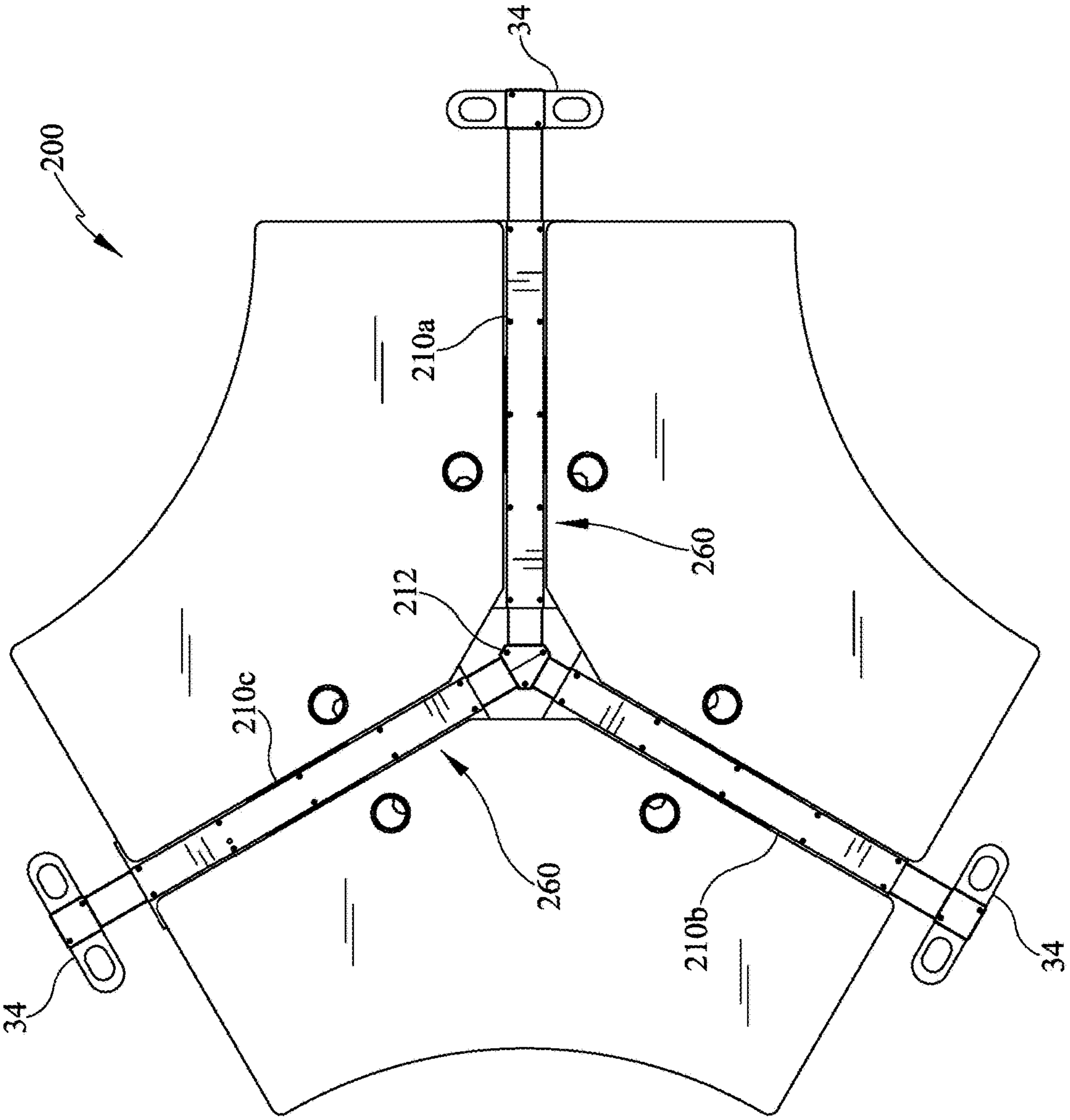
FIG. 10 is a top view of the system of FIG. 9.
Figure 11:
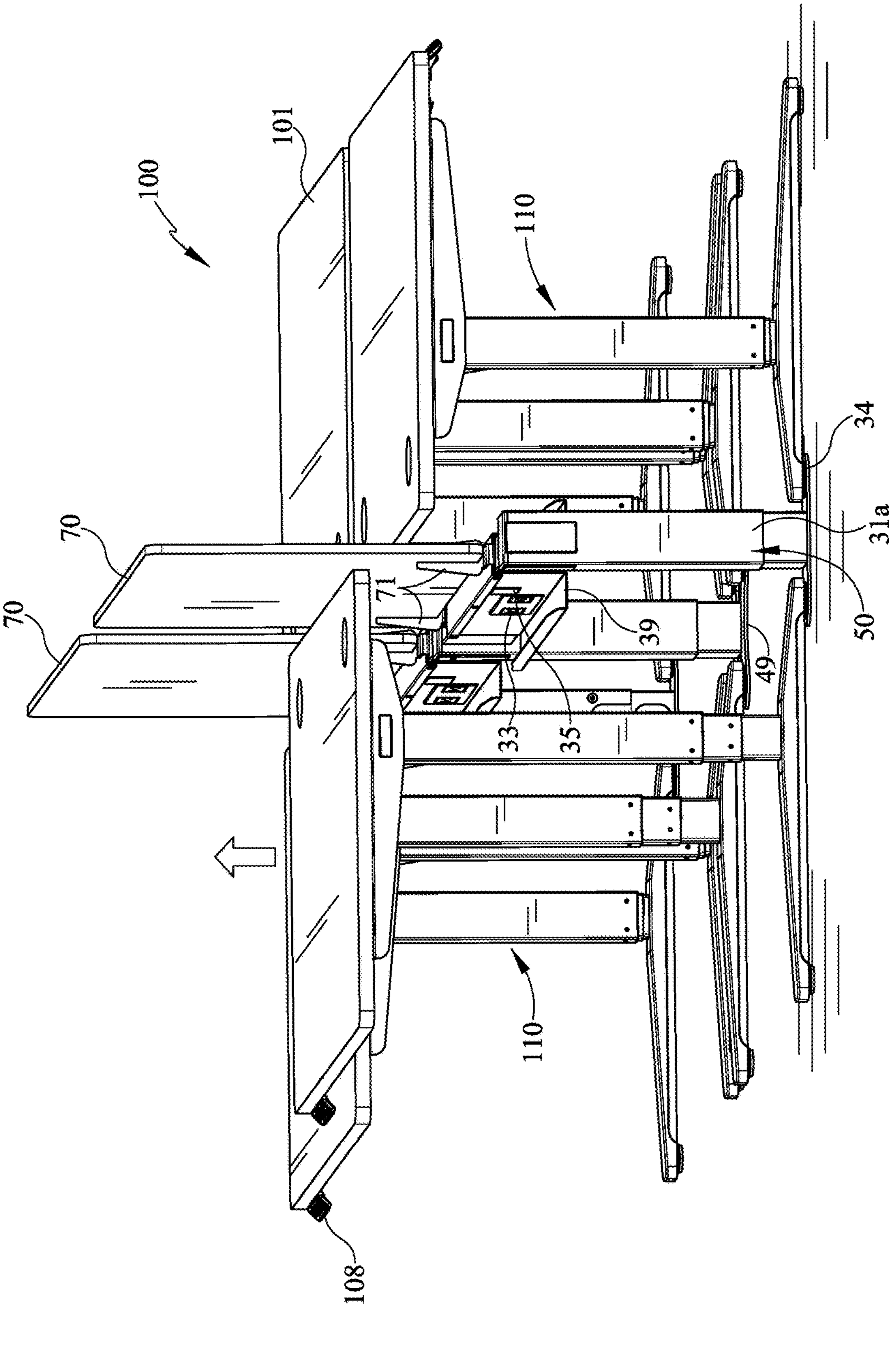
FIG. 11 depicts an upper perspective of another embodiment of the system of FIG. 1 wherein the center rail post and attachment bracket have an alternative center rail post and center rail post foot bracket.
Figure 12:
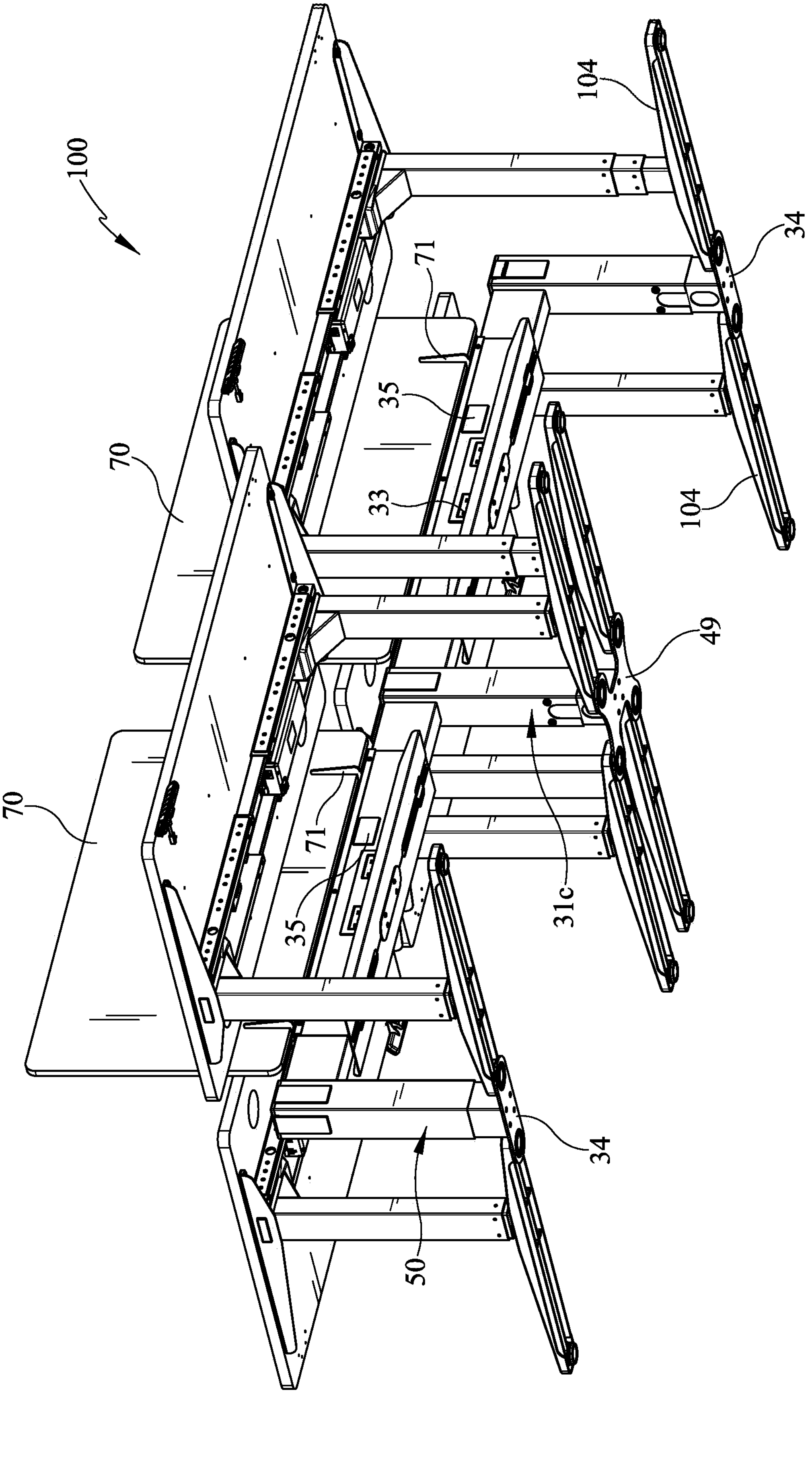
FIG. 12 depicts a lower perspective view of the system of FIG. 11.

Various configurations of vertically adjustable desks may utilize the associated adjustable power and data rail 50. For example, linear desk configurations, T-shaped, 4-way and 120-degree desk configurations may be integrated with the adjustable power and data rail system disclosed herein. For example, as depicted in FIGS. 9 and 10, vertically adjustable desk configuration 200 utilized 120-degree configuration of the adjustable power and data rail 260. Rail 260 may include a 3-way central post 212 which connects to three different rail assemblies 210*a*, 210*b* and 210*c*. Each of the rail assemblies may include a previously described rail assembly and rail extensions. For example, the rail assembly 210*a/b/c* may each include a single rail assembly with rail extensions on either ends of the rail assembly and may also include power and data rail foot bracket 34 at the respective end posts.

The 120-degree configuration 200, as depicted, includes three vertically adjustable desks 202*a*, 202*b* and 202*c* and an adjustable power and data rail 260 interposed between facing desks. The data rail assemblies 210*a*, 210*b* and 210*c* carry data and power lines for connection by user devices. The power and data rail 260 is similarly adjustable in both the vertical and horizontal direction as noted herein using the various rail extensions and alternatives as well as the upper and lower rail posts and alternatives described. The center rail post 212 is connected to each of the respective three end posts while having a respective rail assembly extending between the central rail post and the end rail post, along with the rail extension as needed. Vertically adjustable desk attachment bracket 220 may affix adjacent vertically adjustable desk feet together to secure the various desks together. Attachment bracket 220 may be provided at the joinder point of any adjacent desk feet.

Figure 13:
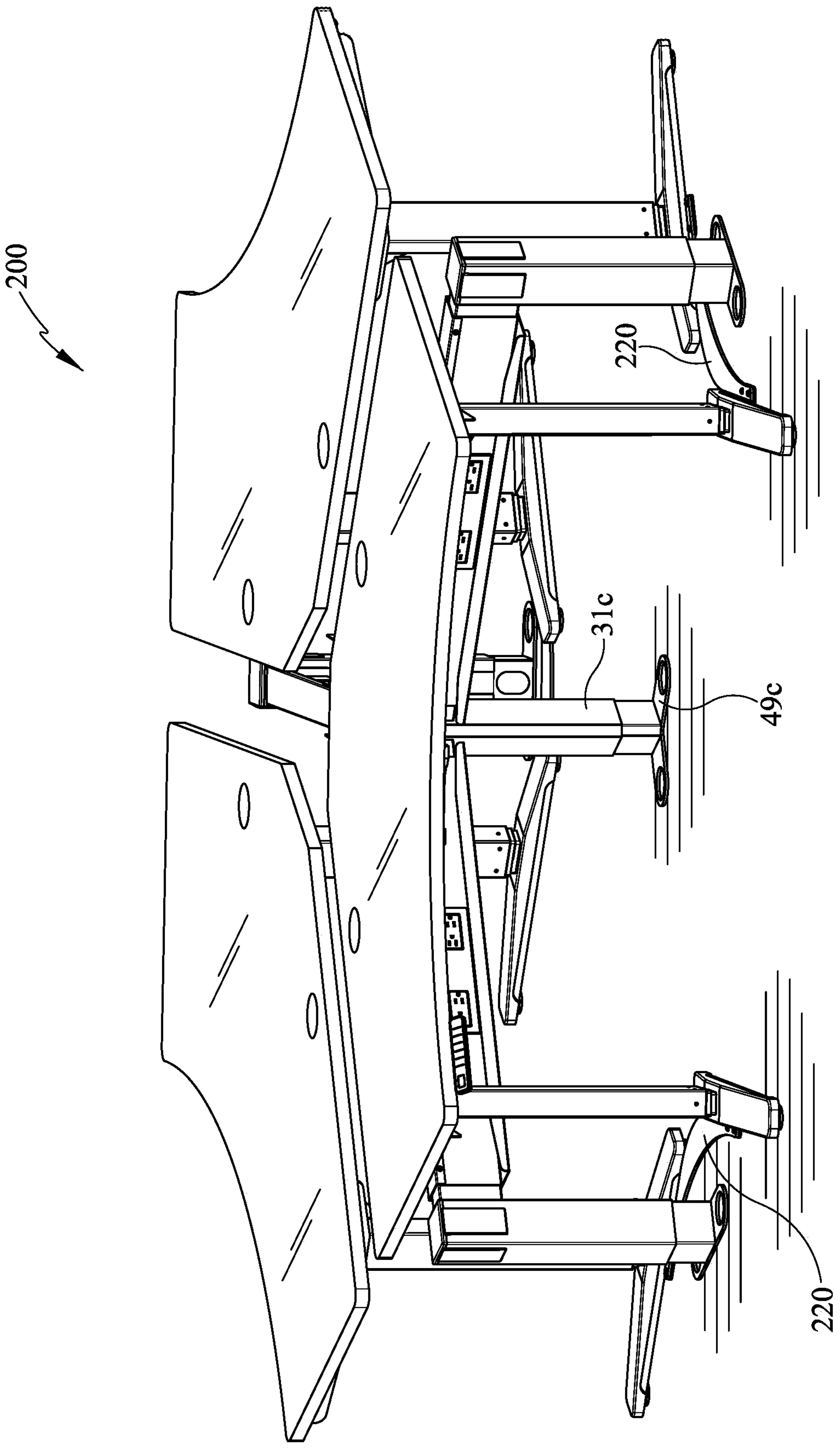
FIG. 13 depicts an upper perspective of an additional embodiment of the system of FIG. 9 wherein the center rail post and the attachment bracket have an alternative center rail post and center rail post foot bracket.
Figure 14:
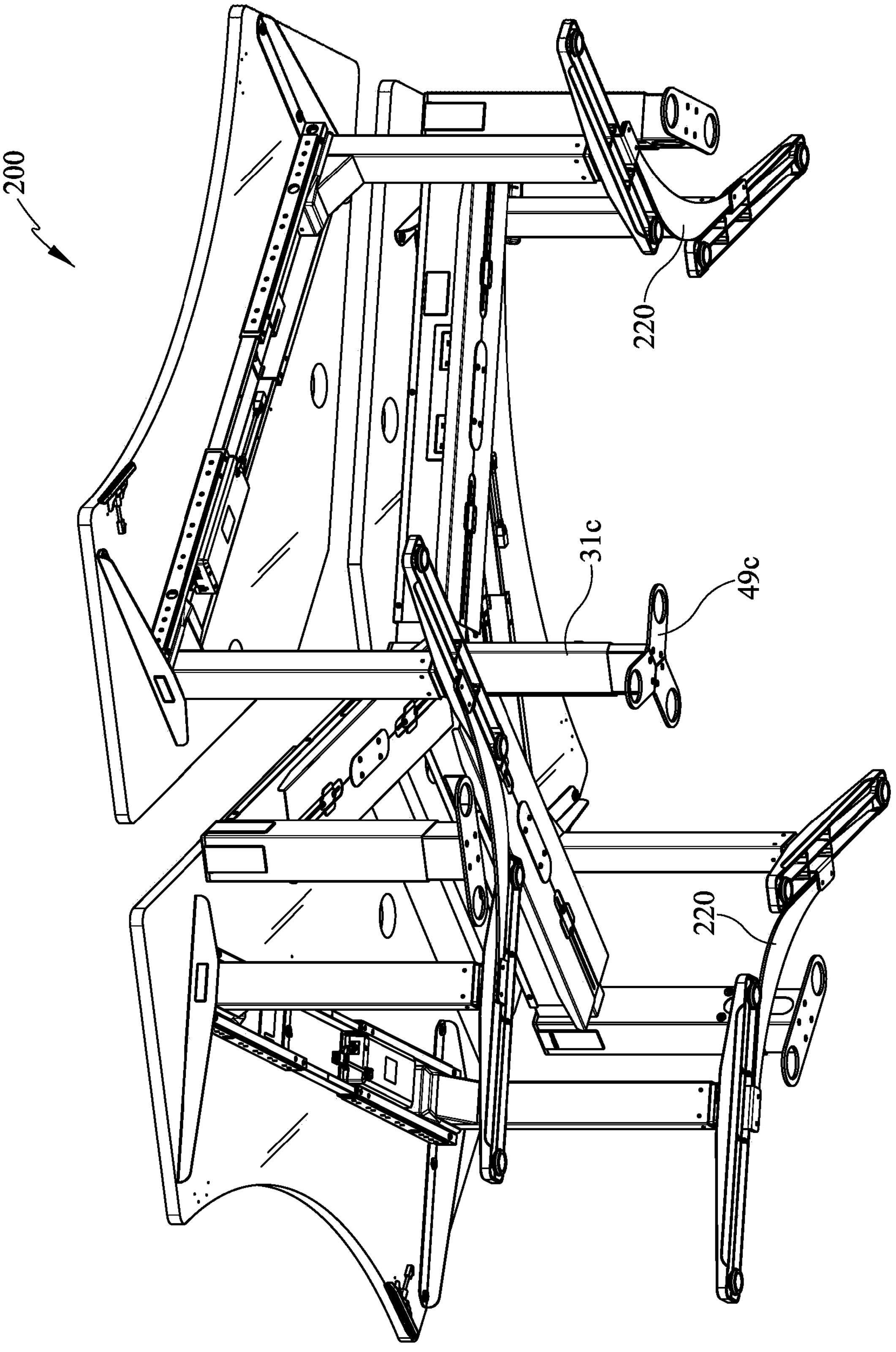
FIG. 14 depicts a lower perspective view of the system of FIG. 13.

As depicted in the further variations of FIGS. 13 and 14, another embodiment of the 120-degree desk configuration 200 is depicted similarly positioned but with vertically adjustable central post 31*c* and receiving bracket 49*c*. In such variation, while receiving bracket is positioned centrally to the three desks, it has a triangular configuration to increase stability of the power and data rail 50 since the rail branches between the three desks at 120 degrees. The central receiving bracket 49*c* does not receive an associated desk foot pad from an adjacent desk but is provided as a central stabilization point for the rail 50. Brackets 220 may be provided to secure adjacent desks to one another.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2 (b) of the Patent Cooperation Treaty ("PCT") do not limit the scope.

The invention claimed is:

1. An adjustable power and data rail for use in combination with a vertically adjustable desk, comprising:

at least one vertically adjustable desk having working surface resting on a first and a second height adjustable leg, wherein the first and the second height adjustable legs raises and lowers the working surface by a control panel which raises and lowers the working surface by virtue of the first and the second height adjustable legs which are expanded or retracted;

an adjustable power and data rail under the working surface of the at least one vertically adjustable desk, the adjustable power and data rail having at least two legs, the adjustable power and data rail both vertically and horizontally expandable;

wherein the adjustable power and data rail has at least a first and a second end rail post; and between the at least first and second end rail post is a rail assembly and at least one rail extension, the at least one rail extension adjusting the overall horizontal length of the power and data rail between the at least one of the first and second end rail post.

2. The adjustable power and data rail of claim 1 wherein rail assembly further includes a wireway, the wireway internal to the rail assembly.

3. The adjustable power and data rail of claim 2 wherein the wireway is external to the rail assembly.

4. The adjustable power and data rail of claim 1 wherein the first end rail post and the second end rail post each have an upper rail post and a lower rail post vertically adjustable relative to each other.

5. The adjustable power and data rail of claim 1 further including a center rail post between the at least one first and second end rail post, wherein the at least one rail extension between the center rail post and the at the first and the second end rail post is a first rail extension and a second rail extension.

6. The adjustable power and data rail of claim 5 wherein the center rail post has a center rail post foot bracket configured to attach to a at least one desk foot.

7. The adjustable power and data rail of claim 6 wherein the center rail post foot bracket has a foot receiving aperture.

8. The adjustable power and data rail of claim 6 wherein the center rail post foot bracket is attachable to an additional first, second, third and fourth desk foot pad.

9. The adjustable power and data rail of claim 8 wherein the center rail post foot bracket has a first, second, third and fourth flange, the first flange positioned to attach to the additional first desk foot pad, the second flange positioned to attach to the additional second desk foot pad, the third flange positioned to attach to the additional third desk foot pad, and the fourth flange positioned to attach to the additional fourth desk foot pad.

10. The adjustable power and data rail of claim 8 wherein the first, second, third and fourth flanges are each a flat flange positioned to affix to an underside surface of a desk foot of the respective desk.

11. The adjustable power and data rail of claim 1 wherein the rail assembly between the first and second end rail post has a longitudinal slot which receives at least one securing mechanism extending into the at least one rail extension.

12. The adjustable power and data rail of claim 1 wherein the rail assembly is tubular.

13. The adjustable power and data rail of claim 12 wherein the rail assembly has at least one data port and at least one power port.

14. The adjustable power and data rail of claim 1 wherein the adjustable power and data rail is positionable below a plurality of desks, at least one of the plurality of desks having a desk foot pad.

15. An adjustable power and data rail for use in combination with a vertically adjustable desk, comprising:

at least one vertically adjustable desk having working surface resting on a first and a second height adjustable leg, wherein both the first and the second height adjustable legs raises and lowers the working surface by a control panel which raises and lowers the working surface by virtue of the first and the second height adjustable legs which are expanded or retracted;

an adjustable power and data rail under the working surface of the at least one vertically adjustable desk, the adjustable power and data rail having two end rail posts, the adjustable power and data rail both vertically and horizontally adjustable;

the adjustable power and data rail removably connected to one desk foot of the at least one vertically adjustable desk at one of the two end rail posts; and the adjustable power and data rail having at least one rail extension between the at two end rail post, the at least one rail extension adjusting the overall horizontal length of the power and data rail between the two end rail posts by telescoping the at least one rail extension and the adjustable power and rail.

16. The adjustable power and data rail of claim 15 wherein the removable connection between the one desk foot of the at least one vertically adjustable desk is a rail post foot bracket which receives the one desk foot of the at least one vertically adjustable desk.

17. The adjustable power and data rail of claim 15 wherein the adjustable power and data rail includes the rail extension and a rail assembly which telescopically receive each other to increase or decrease the horizontal length of the adjustable power and data rail.

18. The adjustable power and data rail for use in combination with a vertically adjustable desk of claim 16 wherein the at least one vertically adjustable desk is a first desk and a second desk, the adjustable power and data rail extending below both the first and the second desk, the two end rail posts include a first end rail post and a second end rail post, wherein the first end rail post is removable connected to the one desk foot of the first desk, the second end rail post removably connected to a second desk foot of the second desk.

19. An adjustable power and data rail for use in combination with a vertically adjustable desk, comprising:

at least one vertically adjustable desk having working surface resting on a first and a second height adjustable leg, wherein the first and the second height adjustable legs raises and lowers the working surface by a control panel which raises and lowers the working surface by virtue of the first and the second height adjustable legs which are expanded or retracted;

an adjustable power and data rail under the working surface of the at least one vertically adjustable desk, the adjustable power and data rail having at least two legs, the adjustable power and data rail both vertically and horizontally expandable below the at least one vertically adjustable desk;

wherein the adjustable power and data rail has at least a first and a second end rail post and a center rail post; and between the at least first and second end rail post is at least one rail assembly and at least one rail extension, the at least one rail extension adjusting the overall horizontal length of the power and data rail between the at least one of the first and second end rail post.

20. The adjustable power and data rail for use in combination with a vertically adjustable desk of claim 19 wherein the at least one vertically adjustable desk is a first and a second vertically adjustable desk and wherein the adjustable power and data rail extends below both the first and the second vertically adjustable desk and is removably affixed to both the first and the second vertically adjustable desk and wherein the adjustable power and data rail has a center rail post between the first and the second end rail post;

and wherein at least one rail assembly is a first rail assembly and a second rail assembly, and wherein the at least one rail extension is a first rail extension and a second rail extension.

* * * * *